US009902393B2

United States Patent
Endo et al.

(10) Patent No.: US 9,902,393 B2
(45) Date of Patent: Feb. 27, 2018

(54) VEHICLE CONTROL SYSTEM

(71) Applicant: TOYOTA JIDOSHA KABUSHIKI KAISHA, Toyota-shi (JP)

(72) Inventors: Takahito Endo, Sunto-gun (JP); Kazumi Hoshiya, Gotemba (JP); Yoshio Ito, Susono (JP); Norimi Asahara, Numazu (JP); Seiji Kuwahara, Susono (JP); Tadashi Fujiyoshi, Susono (JP); Yuji Iwase, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/235,494

(22) Filed: Aug. 12, 2016

(65) Prior Publication Data
US 2017/0066436 A1    Mar. 9, 2017

(30) Foreign Application Priority Data
Sep. 3, 2015 (JP) .................. 2015-173733

(51) Int. Cl.
*B60L 9/00* (2006.01)
*B60L 11/00* (2006.01)
(Continued)

(52) U.S. Cl.
CPC ............... *B60W 20/19* (2016.01); *B60K 6/44* (2013.01); *B60W 10/02* (2013.01); *B60W 10/06* (2013.01);
(Continued)

(58) Field of Classification Search
CPC ...... B60W 10/02; B60W 10/06; B60W 10/08; B60W 20/19; B60W 2510/0638;
(Continued)

(56) References Cited

U.S. PATENT DOCUMENTS 9,156,472 B2 * 10/2015 Ross .................. B60W 30/182
2005/0197761 A1 * 9/2005 Bidner .................. F02P 5/045
701/105

(Continued)

FOREIGN PATENT DOCUMENTS

JP      2004-270512      9/2004
JP      2010-155548      7/2010
(Continued)

*Primary Examiner* — Rachid Bendidi
(74) *Attorney, Agent, or Firm* — Oblon, McClelland, Maier & Neustadt, L.L.P.

(57) ABSTRACT

A vehicle control system is provided to ensure acceleration response while improving energy efficiency in an autonomous vehicle in which an operating mode is selected from an autonomous mode and a manual mode. A switching device is disposed between a motor and drive wheels to switch a driving mode between a direct drive mode and a differential drive mode. A controller executes a motor-idling control to keep a speed of the motor to a standby speed during propulsion in a motor-standby mode. The controller is configured to select a first standby speed of a motor idling control in a case that the vehicle is propelled in the manual mode, and to select a second standby speed that is lower than the first standby speed in a case that the vehicle is propelled in the autonomous mode.

5 Claims, 13 Drawing Sheets

(51) Int. Cl.
  *G05D 1/00* (2006.01)
  *G05D 3/00* (2006.01)
  *G06F 7/00* (2006.01)
  *G06F 17/00* (2006.01)
  *B60W 20/19* (2016.01)
  *B60K 6/44* (2007.10)
  *B60W 10/06* (2006.01)
  *B60W 10/08* (2006.01)
  *B60W 10/02* (2006.01)

(52) U.S. Cl.
  CPC ........... *B60W 10/08* (2013.01); *G05D 1/0061* (2013.01); *B60W 2510/0638* (2013.01); *B60W 2510/104* (2013.01); *B60W 2520/105* (2013.01); *B60W 2520/125* (2013.01); *B60W 2520/14* (2013.01); *B60W 2540/10* (2013.01); *B60W 2540/12* (2013.01); *B60W 2540/18* (2013.01); *G05D 2201/0213* (2013.01)

(58) Field of Classification Search
  CPC ..... B60W 2510/104; B60W 2520/105; B60W 2520/125; B60W 2520/14; B60W 2540/10; B60W 2540/12; B60W 2540/18; B60W 2540/0213; B60W 10/10; B60W 2510/0647; B60W 2510/0652; B60W 2510/0642; B60K 6/44; G05D 1/0061
  See application file for complete search history.

(56) References Cited

U.S. PATENT DOCUMENTS

| | | | |
|---|---|---|---|
| 2009/0221195 A1* | 9/2009 | Suzuki | B63H 21/213 440/86 |
| 2011/0115318 A1* | 5/2011 | Hashimoto | B60K 6/387 310/78 |
| 2013/0090202 A1* | 4/2013 | Hiraiwa | B60K 6/445 475/5 |
| 2014/0163798 A1* | 6/2014 | Ross | B60W 30/182 701/22 |

FOREIGN PATENT DOCUMENTS

| | | |
|---|---|---|
| JP | 2015-131513 | 7/2015 |
| WO | WO 2015/104626 A1 | 7/2015 |

* cited by examiner

VEHICLE CONTROL SYSTEM

CROSS REFERENCE TO RELATED APPLICATIONS

The present invention claims the benefit of priority to Japanese Patent Application No. 2015-173733 filed on Sep. 3, 2015 with the Japanese Patent Office, the entire contents of which are incorporated herein by reference in its entirety.

BACKGROUND

Field of the Invention

Embodiments of the present application relates to the art of a vehicle control system configured to switch an operating mode of a vehicle between manual mode and autonomous mode.

Discussion of the Related Art

JP-A-2015-131513 describes a vehicle control apparatus configured to prevent deterioration of acceleration response of a vehicle. In the vehicle taught by JP-A-2015-131513, an engine and a motor serve as a prime mover, and the vehicle is provided with a sleeve that selectively provides a connection between a first clutch disposed between the engine and drive wheels and a second clutch connected to the motor. The apparatus taught by JP-A-2015-131513 is configured to bring the vehicle into an motor-idling mode by releasing the first clutch.

According to the teachings of JP-A-2015-131513, acceleration response to the acceleration demand can be enhanced by thus idling the motor during propulsion of the vehicle while disconnecting the motor from a powertrain. However, an electric power has to be consumed to idle the motor at a predetermined speed, and in addition, an iron loss of the motor and an agitation loss to agitate oil may be caused as a result of thus idling the motor.

In autonomous vehicles that have been developed in recent years, an operating mode can be selected from a manual mode basically selected to enhance an acceleration response, and an autonomous mode selected to improve an energy efficiency in most situations. In the autonomous vehicles of this kind, the motor-idling control may be executed to enhance acceleration response. However, it is preferable to execute the motor-idling control in such a manner as not to result in reduced energy efficiency in both of the manual mode and the autonomous mode.

SUMMARY

Aspects of embodiments of the present application have been conceived noting the foregoing technical problems, and it is therefore an object of the present application is to provide a vehicle control system configured to ensure acceleration response while improving energy efficiency in an autonomous vehicle in which the motor-idling control is available.

The present invention relates to a vehicle control system that is applied to a vehicle comprising: a motor having an output shaft that serves as a prime mover; a drive wheel rotated at least by the motor; a power transmission route between the motor and the drive wheel; a rotary shaft that is disposed on the power transmission route in the drive wheel side; and a switching device that switches a driving mode of the vehicle between a direct drive mode in which the output shaft and the rotary shaft are rotated integrally or cooperatively at a predetermined speed ratio, and a differential drive mode in which the output shaft and the rotary shaft are rotated relatively or at different speeds. In the vehicle, the driving mode may be further selected from a motor-running mode in which the vehicle is powered by the motor in the direct drive mode, and a motor-standby mode in which the vehicle is powered other than the motor in the differential drive mode. Whereas, an operating mode of the vehicle may be selected from a manual mode in which the vehicle is operated by a manual operation executed by a driver, and an autonomous mode in which the vehicle is operated autonomously in line with a travel plan determining a prospective required driving force. In order to achieve the above-explained objective, according to the preferred example of the present application, the vehicle control system is provided with a controller that is configured to execute a motor-idling control to keep a speed of the motor to a standby speed that is lower than a speed of the rotary shaft during propulsion of the vehicle in the motor-standby mode. Specifically, the controller selects a first standby speed in a case that the vehicle is propelled in the motor-standby mode and that the manual mode is selected, and selects a second standby speed that is lower than the first standby speed in a case that the vehicle is propelled in the motor-standby mode and that the autonomous mode is selected.

In a non-limiting embodiment, the controller may be further configured to increase the first standby speed and the second standby speed with an increase in a vehicle speed.

In a non-limiting embodiment, the controller may be further configured to determine a termination of the motor-standby mode based on the travel plan during execution of the motor-idling control in the motor-standby mode in a case that the vehicle is propelled in the autonomous mode.

In a non-limiting embodiment, a clutch device having a first rotary member and a second rotary member may be used as the switching device. In this case, the first rotary member may be connected to the output shaft and the second rotary member may be connected to the rotary shaft, and the clutch device selectively provides a connection between the first rotary member and the second rotary member.

In a non-limiting embodiment, a planetary gear unit having a first rotary element, a second rotary element and third rotary element may also be used as the switching device. In this case, the first rotary element may be connected to the output shaft and the second rotary element may be connected to the rotary shaft, and the planetary gear unit allows a differential rotation between the first rotary element and the second rotary element.

Thus, according to the preferred embodiment, the vehicle control system executes the motor-idling control during propelling the vehicle in the motor-standby mode by the power other than the output power of the motor so as to keep the speed of the motor to the standby speed that is lower than that of the rotary shaft of the drive wheel side. According to the preferred embodiment, therefore, the driving force can be increased promptly when required in the future. That is, acceleration response can be enhanced. Specifically, in the case that the motor-standby mode is selected in the manual mode, the speed of the motor is kept to the first standby speed by executing the motor-idling control so that the acceleration response to an acceleration demand can be enhanced. By contrast, in the case that the motor-standby mode is selected in the autonomous mode, the speed of the motor is kept to the second standby speed that is lower than the first standby speed so that an electric power to operate the motor can be saved. That is, energy efficiency of the vehicle can be improved.

As described, the first standby speed and the second standby speed are altered in accordance with a vehicle speed. According to the embodiment, therefore, the motor-idling control may be executed properly in both manual and autonomous mode in accordance with the vehicle speed.

In the autonomous mode, a termination of the motor-standby mode is determined in line with the travel plan determining a prospective required driving force after several seconds to several ten seconds. According to the embodiment, therefore, a synchronization of motor speed and engagement of the switching device can be executed in advance based on the travel plan. For this reason, the motor-standby mode can be terminated promptly in accordance with a running condition of the vehicle.

In a case of using the clutch device as the switching device, the driving mode of the vehicle may be switched promptly between the direct drive mode and the differential drive mode by manipulating the clutch device.

In a case of using the planetary gear unit as the switching device, the driving mode of the vehicle may be switched between the direct drive mode and the differential drive mode smoothly without intermission of torque transmission.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Preferred embodiments of the present application will now be explained with reference to the accompanying drawings. A vehicle Ve to which the control system according to the embodiment is applied is provided with at least one motor serving as a prime mover. A driving mode of the vehicle Ve may be selected from a direct drive mode in which an output shaft of the motor and a rotary shaft of a drive wheel side are rotated at a substantially same speed, and a differential drive mode in which the output shaft of the motor and the rotary shaft of the drive wheel side are rotated relatively to each other or rotated at different speeds. The driving mode of the vehicle Ve may be further selected from a motor-running mode in which the vehicle Ve is powered by the motor in the direct drive mode, and a motor-standby mode in which the vehicle Ve is powered by prime mover other than the motor. In addition, an operating mode of the vehicle Ve may be selected from a manual mode in which the vehicle Ve is operated by a manual operation of a driver, and an autonomous mode in which the vehicle Ve is operated autonomously in line with a travel plan prepared in advance.

Figure 1:
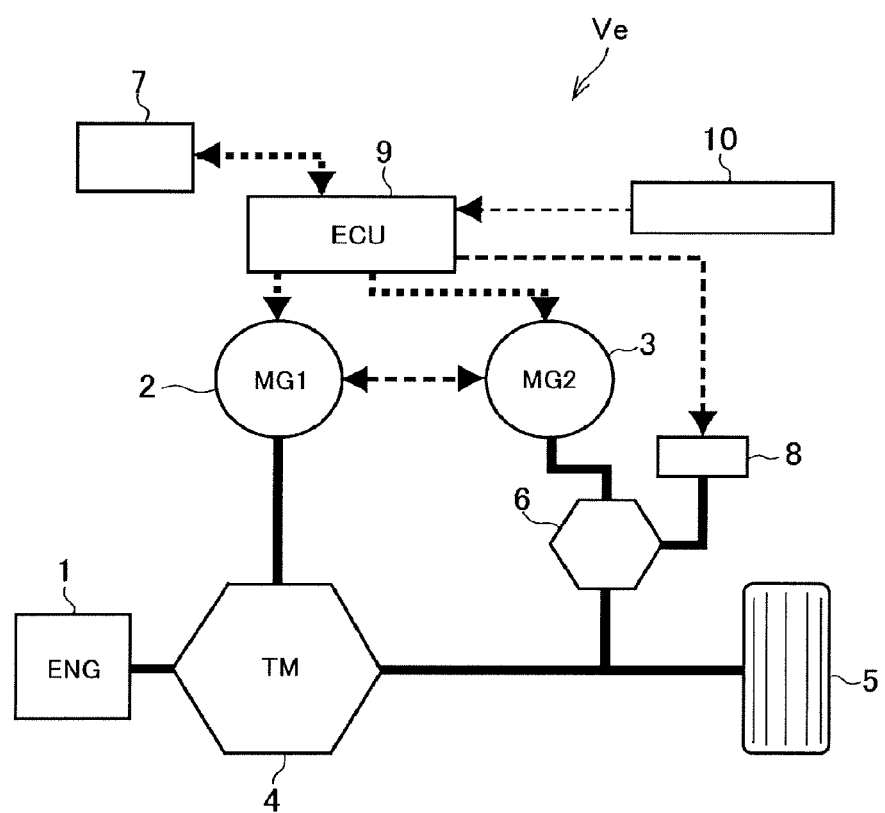
FIG. 1 is a schematic illustration showing a control system of a vehicle according to the embodiment.

Referring now to FIG. 1, there is schematically shown an example of a control system of the vehicle Ve. As shown in FIG. 1, a prime mover of vehicle Ve includes an engine (referred to as "ENG" in FIG. 1) 1, a first motor 2 (referred to as in "MC1" FIG. 1) and a second motor (referred to as in "MG2" FIG. 1) 3. The engine 1 and the first motor 2 are connected to drive wheels 5 through a transmission 4, and the second motor 3 is connected to the drive wheels 5 through a switching device 6.

An output of the engine 1 may be adjusted not only manually but also electrically, and the engine 1 may be started and stopped according to need. For example, given that a gasoline engine is used as the engine 1, an opening degree of a throttle valve, an amount of fuel supply, a commencement and a termination of ignition, an ignition timing etc. may be controlled automatically.

A permanent magnet type synchronous motor having a generating function, that is, a motor-generator may be used individually as the first motor 2 and the second motor 3. The first motor 2 and the second motor 3 are individually connected to a battery 7 through an inverter (not shown) so that rotational speeds and torques thereof can be controlled responsive to a current applied thereto, and hence those motor 2 and 3 can be operated selectively as a motor and a generator.

As to the transmission 4, for example, a conventional geared automatic transmission, a belt-driven continuously variable transmission, a toroidal continuously variable transmission, a power distribution device of hybrid vehicle etc. may be used as the transmission 4. In the embodiment shown in FIG. 1, a power distribution device is used as the transmission 4 to distribute and synthesize powers of the engine 1 and the first motor 2.

In the embodiment shown in FIG. 1, not only front wheels but also rear wheels may serve as the drive wheels 5. Alternatively, all of the front and rear wheels may be rotated to serve as the drive wheels 5. Each of the wheels and rear wheels is individually provided with a brake device (not shown), and any one of the pairs of the front wheels and the rear wheels is connected to a steering device (not shown).

The switching device 6 is disposed on a power transmission route between the second motor 3 and the drive wheels 5. The switching device 6 is actuated by an actuator 8 to selectively switch the driving mode of the vehicle Ve between the aforementioned direct drive mode in which an output shaft of the second motor 3 and a rotary shaft connected to a power transmission route to the drive wheel 5 are rotated at substantially same speeds, and the differential drive mode in which the output shaft of the second motor 3 and the rotary shaft connected to the power transmission route to the drive wheel 5 are rotated relatively to each other or rotated at different speeds. For example, a clutch device may be used as the switching device 6 to selectively provide a connection between a rotary member connected to the output shaft of the second motor 3 and another rotary member connected to the rotary shaft connected to the power transmission route to the drive wheel 5. Alternatively, a planetary gear unit may also be used as the switching device 6. In this case, a first rotary element of the planetary gear unit is connected to the output shaft of the second motor 3 and a second rotary element of the planetary gear unit is connected to the rotary shaft connected to the power transmission route to the drive wheel 5, and the first rotary element and the second rotary element are allowed to rotate at different speeds.

In the vehicle Ve, the driving mode may be further selected from the motor-running mode and the motor-standby mode by manipulating the switching device 6 while controlling the second motor 3. Specifically, in the motor-running mode, the vehicle Ve is powered by the second motor 3 while establishing the direct drive mode by operating the switching device 6. Whereas, in the motor-standby mode, the vehicle Ve is powered by a power other than an output power of the second motor 3 such an output power of the engine 1 and an inertial force while establishing the differential drive mode by operating the switching device 6. In the motor-standby mode, a rotational speed of the second motor 3 is lowered to a standby speed that is lower than a rotational speed of the rotary shaft connected to the power transmission route to the drive wheel 5. That is, a motor-idling can be executed in the motor-standby mode.

As described, an operating mode of the vehicle Ve may be selected from the manual mode and the autonomous mode. In the manual mode, specifically, the vehicle Ve is manipulated by an accelerating operation, a braking operation, a steering operation and so on executed by the driver. By contrast, in the autonomous mode, the vehicle is manipulated autonomously without requiring a manual operation of the driver. In the autonomous mode, specifically, the vehicle Ve is manipulated in line with a travel plan created in advance.

In order to control the engine 1, the first motor 2, the second motor 3, the switching device 6, the brake device, the steering device and so on, the vehicle Ve is provided with a controller (referred to as "ECU" in FIG. 1) 9 as an electronic control unit composed mainly of a microcomputer. Specifically, detection signals and information from sensors 10 including on-board units are sent to the controller 9. Although only one controller is depicted in FIG. 1, a plurality of controllers 9 may be arranged in the vehicle Ve to control the above-listed devices individually.

The sensor 10 includes internal sensors for detecting operating conditions and behaviors of the constituent elements of the vehicle Ve, and external sensors for detecting external condition of the vehicle Ve. Specifically, the sensor 10 includes an accelerator sensor for detecting an opening degree of an accelerator, a brake sensor (or switch) for detecting a depression of a brake pedal, a steering sensor for detecting a steering angle of the steering device, an engine speed sensor for detecting a speed of the engine 1, an output speed sensor for detecting a speed of an output shaft of the transmission 4, a vehicle speed sensor for detecting rotational speeds of the front wheels and the rear wheels, a longitudinal acceleration sensor for detecting a longitudinal acceleration of the vehicle Ve, a lateral acceleration sensor for detecting a lateral acceleration of the vehicle Ve, a yaw rate sensor for detecting a yaw rate of the vehicle Ve and so on.

The sensor 10 further includes at least one of the following external sensors for detecting an external condition, such as an on-board camera, a RADAR (i.e., a radio detection and ranging) and a LIDAR (i.e., a laser imaging detection and ranging).

Specifically, the on-board camera is arranged inside of a windshield glass, and transmits recorded information about the external condition to the controller 9. To this end, not only a monocular camera but also a stereo camera having a plurality of lenses and image sensors to achieve a binocular vision may be used as the on-board camera. If the stereo camera is used as the on-board camera, the controller 9 is allowed to obtain three-dimensional information in the forward direction.

The RADAR is adapted to detect obstacles utilizing radio waves such as millimetric-waves and microwaves, and to transmit detected information to the controller 9. Specifically, the RADAR detects an obstacle such as other vehicles and so on by emitting radio waves and analyzing the radio waves reflected from the obstacle.

Likewise, the LIDAR is adapted to detect obstacles utilizing laser light and to transmit detected information to the controller 9. Specifically, the LIDAR detects an obstacle such as other vehicles and so on by emitting laser light and analyzing the laser light reflected from the obstacle.

In addition, the vehicle Ve is further provided with a GPS (i.e., global positioning system) receiver, a digital map database, and a navigation system. Specifically, the GPS receiver is adapted to obtain a position (i.e., latitude and longitude) based on incident signals from GPS satellites, and to transmit the positional information to the controller 9. The digital map database may be installed in the controller 9, but map information stored in external online information processing systems may also be available. The navigation system is configured to determine a travelling route of the vehicle Ve based on the positional information obtained by the GPS receiver and the map database.

The controller 9 carries out calculations based on the incident data or information from the sensor 10 and preinstalled data, and calculation results are sent in the form of command signal to the engine 1, the first motor 2, the second motor 3, the switching device 6, and to the actuators of the brake device, the steering device and so on.

In order to operate the vehicle Ve autonomously, the vehicle Ve is further provided with a throttle actuator, a brake actuator, a steering actuator and so on. Specifically, the throttle actuator is adapted to change an opening degree of the throttle valve or electric powers supplied to the first motor 2 and the second motor 3 in response to reception of the command signal. The brake actuator is adapted to actuate the brake device to control braking force applied to the front wheels and the rear wheels in response to reception of the command signal. The steering actuator is adapted to activate the assist motor of the steering device to control a steering torque in response to reception of the command signal.

The controller 9 includes a position recognizer, an external condition recognizer, a running condition recognizer, a travel plan creator, a travel controller and so on.

Specifically, the position recognizer is configured to recognize a current position of the vehicle Ve on the map based on the positional information received by the GPS receiver and the map database. The current position of the vehicle Ve may also be obtained from the positional information used in the navigation system. Optionally, the vehicle Ve may also be adapted to communicate with external sensors arranged along the road to obtain the current position of the vehicle Ve.

The external condition recognizer is configured to recognize external condition of the vehicle Ve such as a location of a traffic lane, a road width, a road configuration, a road gradient, an existence of obstacles around the vehicle Ve and so on, based on the recorded information of the on-board camera, or detection data of the RADAR or the LIDAR. Optionally, weather information, a friction coefficient of road surface etc. may be obtained according to need.

The running condition recognizer is configured to recognize running condition of the vehicle Ve such as a vehicle speed, a longitudinal acceleration, a lateral acceleration, a yaw rate and so on based on detection result of the internal sensors.

The travel plan creator is configured to create a travel locus of the vehicle Ve based on a target course determined by the navigation system, a position of the vehicle Ve recognized by the position recognizer, and an external condition recognized by the external condition recognizer. That is, the travel plan creator creates a travel locus of the vehicle Ve within the target course in such a manner that the vehicle Ve is allowed to travel safely and properly while complying traffic rules.

In addition, the travel plan creator is further configured to create a travel plan in line with the created travel locus. The travel plan creator creates a travel plan in line with the target course based on the recognized external conditions and the map database.

Specifically, the travel plan is created based on prospective data after few seconds from the present moment to determine a future condition of the vehicle Ve such as a driving force or the like required in future. Optionally, the travel plan may also be created based on prospective data after several ten seconds depending on the external conditions and the running conditions. Thus, the travel plan creator creates a future plan to change a vehicle speed, acceleration, steering torque etc. during travelling along the target course in the form of e.g., a map.

Alternatively, the travel plan creator may also create a pattern to change the vehicle speed, acceleration, steering torque etc. between predetermined points on the travel locus. Specifically, such patterns may be determined by setting target values of those parameters at each point on the travel locus taking account of a required time to reach the point at the current speed.

The travel controller is configured to operate the vehicle Ve autonomously in line with the travel plan created by the travel plan creator. To this end, specifically, the travel controller transmits command signals to the throttle actuator, the brake actuator, the steering actuator and so on in accordance with the travel plan.

Details of autonomous operation of the vehicle in line with the travel plan are described in more detail in the publication of JP-A-2014-234582. That is, the vehicle Ve can be operated not only autonomously e.g., by the teachings of JP-A-2014-234582, but also manually by the driver.

Figure 2:
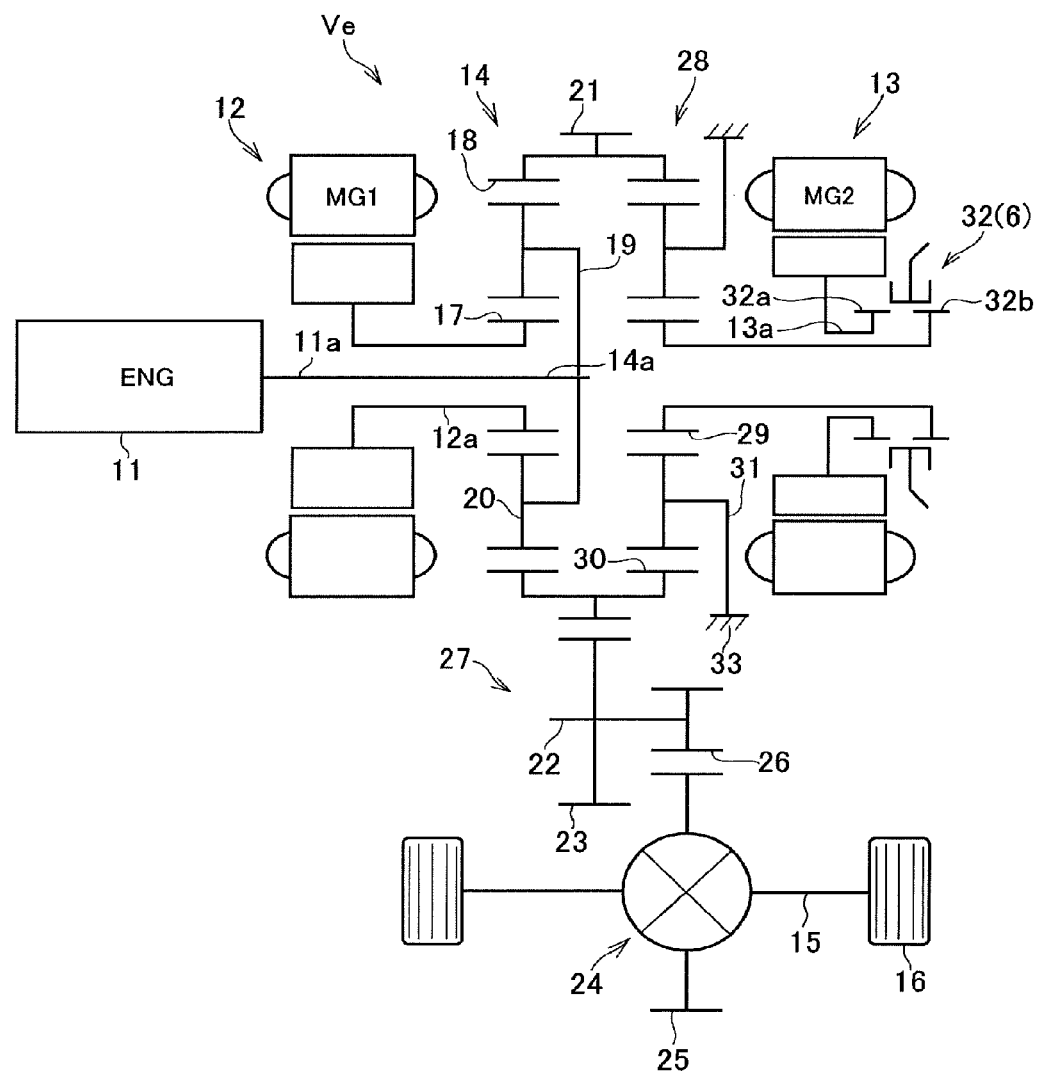
FIG. 2 is a schematic illustration showing a first example of the vehicle to which the vehicle control system according to the embodiment is applied.

Turning now to FIG. 2, there is shown a first example of a powertrain of the vehicle Ve. According to the preferred embodiment, the control system is applied to the vehicle Ve as a hybrid vehicle in which a prime mover includes an engine 11 (referred to as "ENG" in FIG. 2), a first motor 12 (referred to as "MG1" in FIG. 2), and a second motor 13 (referred to as "MG2" in FIG. 2). In the vehicle Ve, a power of the engine 11 is distributed to the first motor 12 side and to a driveshaft 15 and drive wheels 16 side through a power distribution device 14.

For example, a single-pinion planetary gear unit having a sun gear 17, a ring gear 18 and a carrier 19 may be used as the power distribution device 14, and the power distribution device 14 is arranged coaxially with an output shaft 11a of the engine 11.

The first motor 12 is arranged coaxially with the engine 11 and the power distribution device 14 while being connected to the sun gear 17 of the power distribution device 14. In the power distribution device 14, specifically, the sun gear 17 is connected to an output shaft 12a of the first motor 12, and the ring gear 18 as an internal gear is situated concentrically with the sun gear 16. A plurality of pinion gears 20 are interposed between the sun gear 17 and the ring gear 18 while meshing with those gears, and the pinion gears 20 are supported by the carrier 19 connected to an input shaft 14a of the power distribution device 14 in a rotatable and revolvable manner. The input shaft 14a is also connected to the output shaft 11a of the engine 11 through a flywheel and a damper device (neither of which are shown).

A drive gear 21 is an external gear that is formed around the ring gear 18 of the power distribution device 14 integrally therewith, and a countershaft 22 is arranged in parallel with a common rotational axis of the power distribution device 14 and the first motor 12. A counter driven gear 23 is fitted onto one of the end portions of the countershaft 22 (i.e., left side in FIG. 2) in such a manner as to be rotated integrally therewith while being meshed with the drive gear 21. A counter drive gear 26 is fitted onto the other end portion of the countershaft 22 (i.e., right side in FIG. 2) in such a manner as to be rotated integrally therewith while being meshed with a ring gear 25 of a differential gear unit 24 as a final reduction. Thus, the ring gear 18 of the power distribution device 14 is connected to the drive wheels 16 through the drive gear 21, the countershaft 22, the counter driven gear 23, the counter drive gear 26, the deferential gear unit 26 and the driveshaft 15.

Torque of the second motor 13 can be added to torque transmitted from the power distribution device 14 to the driveshaft 15. To this end, the second motor 13 is arranged coaxially with the engine 11, the power distribution device 14, and the first motor 12. A speed reducing device 28 is disposed between the second motor 13 and the power distribution device 14 so that the second motor 13 is connected to a gear train 27 including the counter driven gear 23, the counter drive gear 26 and the differential gear unit 24 through the speed reducing device 28.

For example, a single-pinion planetary gear unit having a sun gear 29, a ring gear 30 and a carrier 31 may also be used as the speed reducing device 28, and the speed reducing device 28 is arranged coaxially with the power distribution device 14. Specifically, the ring gear 30 of the speed reducing device 28 is connected to the ring gear 18 of the power distribution device 14 in such a manner as to rotate integrally therewith, and a drive gear 21 is formed integrally around the ring gear 30 of the speed reducing device 28.

An output shaft 13a of the second motor 13 is connected to the sun gear 29 of the speed reducing device 28 through a clutch 32 having a similar structure as the aforementioned switching device 6. Specifically, the clutch 32 is adapted to selectively provide a connection between a first rotary member 32a connected to the output shaft 13a of the second motor 13 and a second rotary member 32b connected to the sun gear 29. That is, in the first example shown in FIG. 2, the direct drive mode is achieved by connecting the first rotary member 32a to the second rotary member 32b by the clutch 32 so that the sun gear 29 and the output shaft 13a are rotated integrally. By contrast, the sun gear 29 and the output shaft 13a are allowed to rotate relatively at different speeds by disconnecting the first rotary member 32a from the second rotary member 32b by the clutch 32. That is, the differential drive mode is achieved.

The carrier 31 of the speed reducing device 28 is fixed to a stationary member 33 such as a casing in such a manner as not to be rotated. In the direct drive mode, therefore, an input speed from the output shaft 13a of the second motor 13 to the sun gear 29 of the speed reducing device 28 is reduced and outputted from the ring gear 30 and the drive gear 21. Thus, in the direct drive mode, the second motor 13 is connected to the drive wheels 16 through the speed reducing device 28, the gear train 27, the differential gear unit 24 and the drive shaft 15.

As described, the operating mode of the vehicle Ve can be selected from the manual mode and the autonomous mode, and driving mode of the vehicle Ve can be selected from the motor-running mode and the motor-standby mode. The motor-standby mode may be established in both of the manual mode and the autonomous mode. In the motor-standby mode, acceleration response of the vehicle Ve can be enhanced by executing the motor-idling control in such a manner as to lower a rotational speed of the motor that is not generating a driving force to the standby speed. However, during execution of the motor-idling control, an electric power is consumed to drive the motor at the standby speed, and in addition, a power loss is caused by thus driving the motor. That is, the motor-idling control may result in reduced energy efficiency of the vehicle Ve.

In the manual mode, high-acceleration response is required to operate the vehicle Ve manually. By contrast, in the manual mode, it is preferable to improve energy efficiency rather than enhancing acceleration response even if acceleration response is degraded. According to the embodiment, therefore, the controller 9 is configured to set the motor-standby speed of the motor-idling control to a first standby speed in a case that the motor-standby mode is selected in the manual mode, and to set the motor-standby speed to a second standby speed that is lower than the first standby speed in a case that the motor-standby mode is selected in the autonomous mode.

Figure 3:
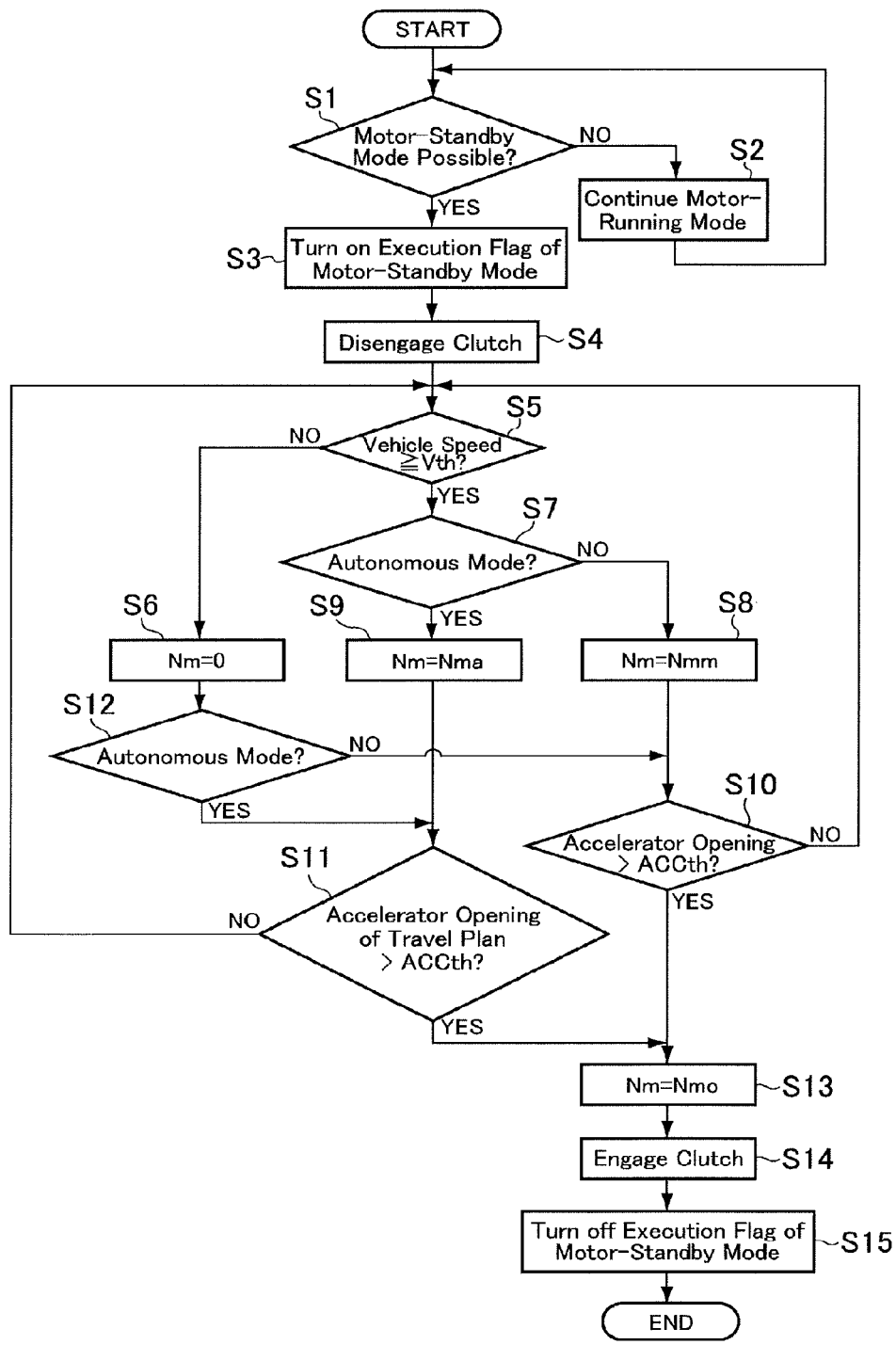
FIG. 3 is a flowchart showing a control example carried out by the control system.

Turning to FIG. 3, there is shown an example of such control carried out by the controller 9, and an example of executing the routine shown in FIG. 3 in the vehicle Ve shown in FIG. 2 will be explained hereinafter with reference to FIG. 3. The routine shown in FIG. 3 is carried out during propulsion in the motor-running mode in both of the manual mode and the autonomous mode. During propulsion in the motor-running mode, first of all, feasibility of the motor-standby mode is determined at step S1. That is, at step S1, it is determined whether or not the motor-idling control can be executed by shifting the driving mode from the motor-running mode to the motor-standby mode.

Figure 4:
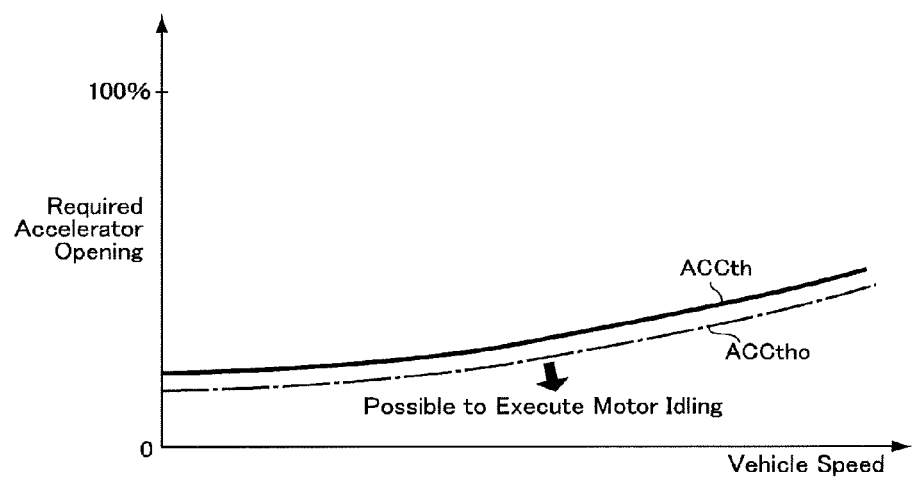
FIG. 4 is a map determining thresholds used to determine an execution and a termination of a motor-standby mode.

Specifically, it is determined whether or not a required opening degree of an accelerator is smaller than a first threshold ACCtho to start the motor-idling control. In the manual mode, the required opening degree of the accelerator is governed by a manual operation of the accelerator. By contrast, in the autonomous mode, the required opening degree of the accelerator is governed by the aforementioned travel plan. As indicated by a dashed-dotted curve in FIG. 4, the first threshold ACCtho is slightly increased with an increase in a vehicle speed.

For example, if the required opening degree of the accelerator is larger than the first threshold ACCtho so that the answer of step S1 is NO, the motor-idling mode cannot be executed. In this case, the routine advances to step S2 to continue the motor-running mode, and then returned to step S1. Such determination at step S1 and continuance of the motor-running mode at step S2 are repeated until the above-explained condition to start the motor-idling control is satisfied.

By contrast, if the required opening degree of the accelerator is reduced to be smaller than the first threshold ACCtho so that the answer of step S1 is YES, the routine progresses to step S3 to turn on an execution flag of the motor-standby mode. Specifically, the execution flag of the motor-standby mode is turned on to commence the motor-standby mode, and turned off to terminate the motor-standby mode. Then, at step S4, the differential drive mode is established by manipulating the switching device 6. For example, in the vehicle Ve shown in FIG. 2, the differential drive mode is achieved by manipulating the switching device 6 in such a manner as to interrupt power transmission between the output shaft 13a of the second motor 13 and the sun gear 29 of the speed reducing device 28.

Figure 5:
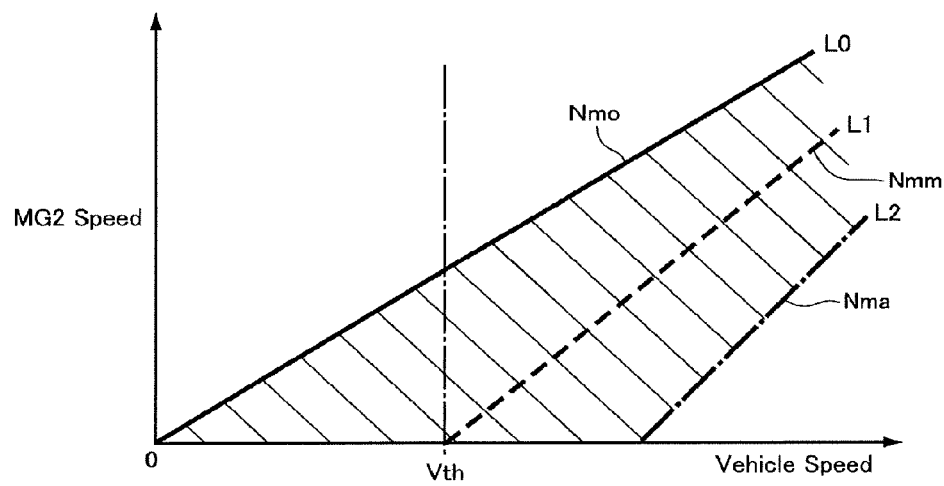
FIG. 5 is a map determining standby speeds as target speeds of the motor during execution of the routine shown in FIG. 3.

Then, a vehicle speed is compared to a threshold speed Vth at step S5 to determine the standby speed of the second motor 13 during execution of the motor-idling control in the motor-standby mode in such a manner as to ensure acceleration response to a future acceleration demand. Turning to FIG. 5, there is shown a map determining the standby speeds of the second motor 13. As shown in FIG. 5, specifically, the dashed line L1 represents a first standby speed Nmm of the second motor 13, and the threshold speed Vth is set to a speed at which the first standby speed Nmm is zero.

Specifically, the first standby speed Nmm is a lower limit value of the speed of the second motor 13 to ensure acceleration response to a future acceleration demand during execution of the motor-idling control in the manual mode. In FIG. 5, the solid line L0 represents a speed Nmo of the second motor 13 corresponding to the vehicle speed in the motor-running mode in which the vehicle Ve is powered by the second motor 13. In the manual mode, therefore, the controller 9 determines at step S5 that the acceleration response to a future acceleration demand can be ensured during execution of the motor-idling control if the speed of the second motor 13 is higher than the first standby speed Nmm, that is, falls within a region between the dashed line L1 and the solid line L0.

In the map shown in FIG. 5, the dashed-dotted line L2 represents a second standby speed Nma of the second motor 13 as a lower limit value of the speed of the second motor 13 to ensure acceleration response to a future acceleration demand during execution of the motor-idling control in the autonomous mode. In the autonomous mode, therefore, the controller 9 determines at step S5 that the acceleration response can be ensured during execution of the motor-idling control if the speed of the second motor 13 is higher than the second standby speed Nma, that is, falls within a region between the dashed-dotted line L2 and the solid line L0. As described later, the second standby speed Nma is set to be lower than the first standby speed Nmm (including zero) over the entire speed range.

Thus, the threshold speed Vth is set to a speed at which the speed of the second motor 13 required to ensure acceleration response to a future acceleration demand is zero. That is, given that the vehicle speed is lower than the threshold speed Vth, the acceleration response to a future acceleration demand can be ensured by increasing the speed of the second motor 13 from zero. If the vehicle speed is lower than the threshold speed Vth so that the answer of step S5 is NO, the routine progresses to step S6 to set a target speed Nm of the second motor 13 during execution of the motor-idling control to zero, and the motor-idling control is commenced.

By contrast, if the vehicle speed is equal to or higher than the threshold speed Vth so that the answer of step S5 is YES, the routine progresses to step S7 to determine whether or not the vehicle Ve is currently propelled in the autonomous mode.

If the vehicle Ve is currently propelled in the manual mode so that the answer of step S7 is NO, the routine progresses to step S8 to set the target speed Nm of the second motor 13 during execution of the motor-idling control to the first standby speed Nmm that is higher than the second standby speed Nma, and the motor-idling control is commenced.

As described, in the manual mode, it is preferable to enhance acceleration response to a future acceleration demand in comparison with that in the autonomous mode, rather than improving energy efficiency. At step S8, therefore, the standby speed of the second motor 13 during execution of the motor-idling control is set to the first standby speed Nmm that is higher than the second standby speed Nma. Consequently, a synchronization of the clutch 32 can be achieved promptly when shifting from the motor-standby mode to the motor-running mode so that acceleration response of the vehicle Ve can be enhanced.

By contrast, if the vehicle Ve is currently propelled in the autonomous mode so that the answer of step S7 is YES, the routine progresses to step S9 to set the target speed Nm of the second motor 13 during execution of the motor-idling control to the second standby speed Nma, and the motor-idling control is commenced. As described, the second standby speed Nma is lower than the first standby speed Nmm, and the second standby speed Nma includes zero.

As also described, in the autonomous mode, it is preferable to improve energy efficiency in comparison with that in the manual mode, rather than enhancing acceleration response. At step S9, therefore, the standby speed of the second motor 13 during execution of the motor-idling control is set to the second standby speed Nma that is lower than the first standby speed Nmm. Consequently, an electric power to operate the second motor 13 can be saved while reducing a power loss resulting from rotating the second motor 13 during execution of the motor-idling control. In addition, acceleration response of the vehicle Ve may still be enhanced in comparison with that of a case in which the motor-idling is not executed.

After thus setting the standby speed of the second motor 13 to the first standby speed Nmm at step S8, the routine progresses to step S10 to determine whether or not to continue the motor-standby mode. At step S10, specifically, it is determined whether or not the required opening degree of the accelerator is larger than a second threshold ACCth to terminate the motor-standby mode. In this case, the required opening degree of the accelerator is governed by a manual operation of the accelerator executed by the driver. As indicated by the solid curve in FIG. 4, the second threshold ACCth is set to a relatively small degree but slightly larger than the first threshold ACCtho, and slightly increased with an increase in the vehicle speed. That is, a predetermined hysteresis is maintained between the first threshold ACCtho and the second threshold ACCth so as to prevent a control hunting.

If the required opening degree of the accelerator is smaller than the second threshold ACCth so that the answer of step S10 is NO, the routine is returned to step S5 to repeat the foregoing controls. That is, the motor-standby mode is continued in the manual mode.

Whereas, in a case that the standby speed of the second motor 13 is set to the second standby speed Nma at step S9, the routine progresses to step S11 to determine whether or not to continue the motor-standby mode. At step S11, specifically, it is also determined whether or not the required opening degree of the accelerator is larger than a second threshold ACCth to terminate the motor-standby mode. In this case, the required opening degree of the accelerator is governed by the travel plan prepared in advance to propel the vehicle Ve in the autonomous mode.

If the required opening degree of the accelerator is smaller than the second threshold ACCth so that the answer of step S11 is NO, the routine is also returned to step S5 to repeat the foregoing controls. That is, the motor-standby mode is continued in the autonomous mode.

Whereas, in a case that the standby speed of the second motor 13 is set to zero at step S6, the routine progresses to step S12 to determine whether or not the vehicle Ve is currently propelled in the autonomous mode.

If the vehicle Ve is currently propelled in the manual mode so that the answer of step S12 is NO, the routine also progresses to step S10 to determine whether or not to continue the motor-standby mode.

By contrast, if the vehicle Ve is currently propelled in the autonomous mode so that the answer of step S12 is YES, the routine also progresses to step S11 to determine whether or not to continue the motor-standby mode.

If the required opening degree of the accelerator in the manual mode is larger than the second threshold ACCth so that the answer of step S10 is YES, or if the required opening degree of the accelerator in the autonomous mode is larger than the second threshold ACCth so that the answer of step S11 is YES, the routine progresses to step S13.

At step S13, the target speed Nm of the second motor 13 is set to the speed Nmo of the second motor 13 in the motor-running mode. At step S13, specifically, rotational speeds of the first rotary member 32a and the second rotary member 32b are synchronized with each other to be connected by the clutch 32 to terminate the motor-standby mode.

Thereafter, or at the same time, the first rotary member 32a and the second rotary member 32b are connected to each other at step S14 by the clutch 32.

As a result, the motor-standby mode is terminated and hence the execution flag of the motor-standby mode is turned off. Then, the routine is terminated.

Figure 6:
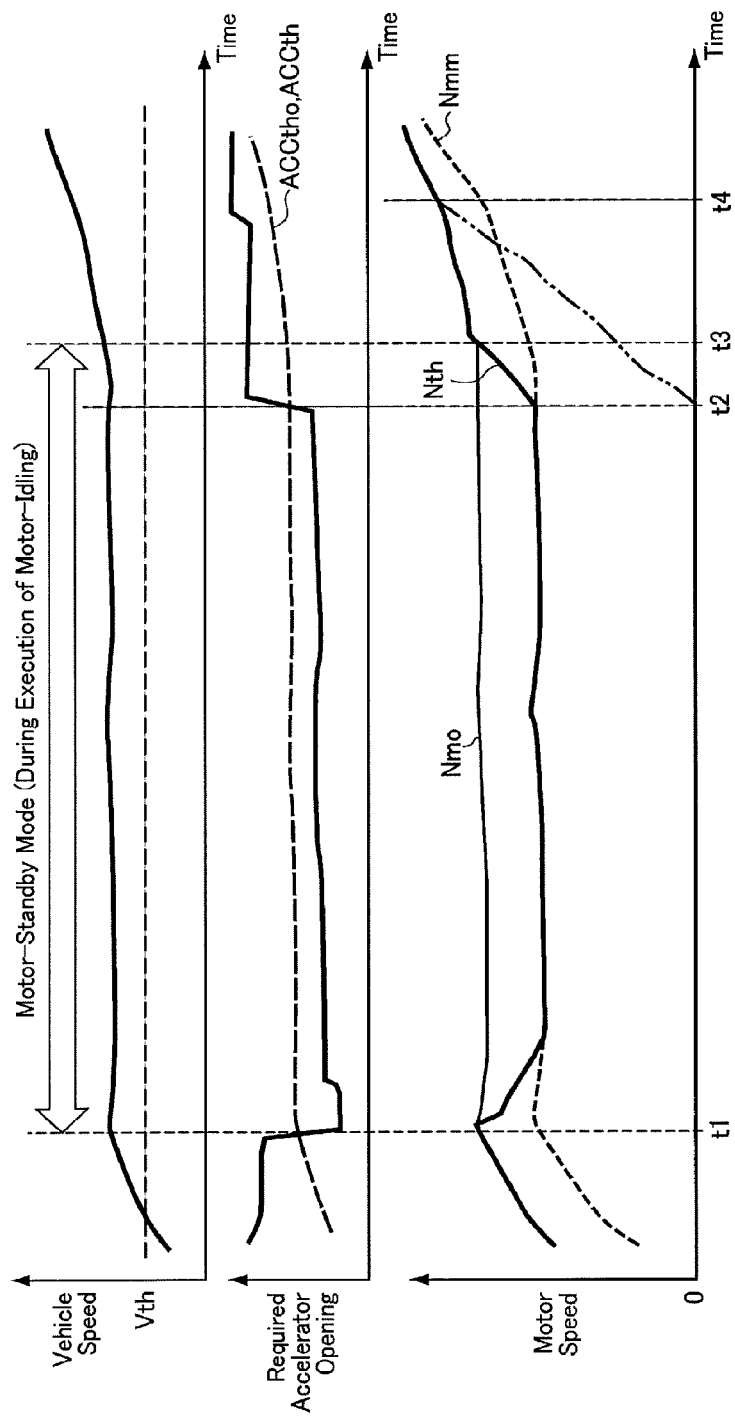
FIG. 6 is a time chart indicating a temporal change in a motor speed during execution of the motor-idling control in the manual mode.

Turning to FIG. 6, there is shown a temporal change in a speed of the second motor 13 during execution of the motor-idling control in the manual mode. When the accelerator pedal is returned by the driver and hence the opening degree of the accelerator is reduced to be smaller than the first threshold ACCtho at point t1, the motor-standby mode is commenced at point t1. Specifically, the clutch 32 is released and the motor-idling control is executed. In this situation, the vehicle speed is higher than the threshold speed Vth and hence the target speed Nm of the second motor 13 is set to the first standby speed Nmm.

When the accelerator pedal is depressed by the driver at point t2 so that the opening degree of the accelerator is increased to be larger than the second threshold ACCth, the synchronization of the clutch 32 is executed to shift from the motor-standby mode to the motor-running mode. Specifically, the target speed Nm of the second motor 13 is altered from the first standby speed Nmm to the speed Nmo of the second motor 13 in the motor-running mode thereby increasing the speed of the second motor 13 toward the speed Nmo, and the clutch 32 is brought into engagement. When the synchronization of the clutch 32 is completed at point t3, the motor-standby mode is terminated and the motor-running mode is commenced.

In FIG. 6, the dashed-two dotted curve represents a temporal change in the speed of the second motor 13 according to a comparison example in which the motor-idling control is not executed. In this case, the speed of the second motor 13 is zero before point t2, and when acceleration of the vehicle Ve is demanded at point t2, the speed of the second motor 13 is increased toward the speed Nmo. According to the comparison example, a period of time from point t2 to point t4 is required to complete the above-explained synchronization. By contrast, in the case of executing the motor-idling control, the above-explained synchronization is completed within a period from point t2 to point t4. Thus, acceleration response of the vehicle can be enhanced by executing the motor-idling control.

Figure 7:
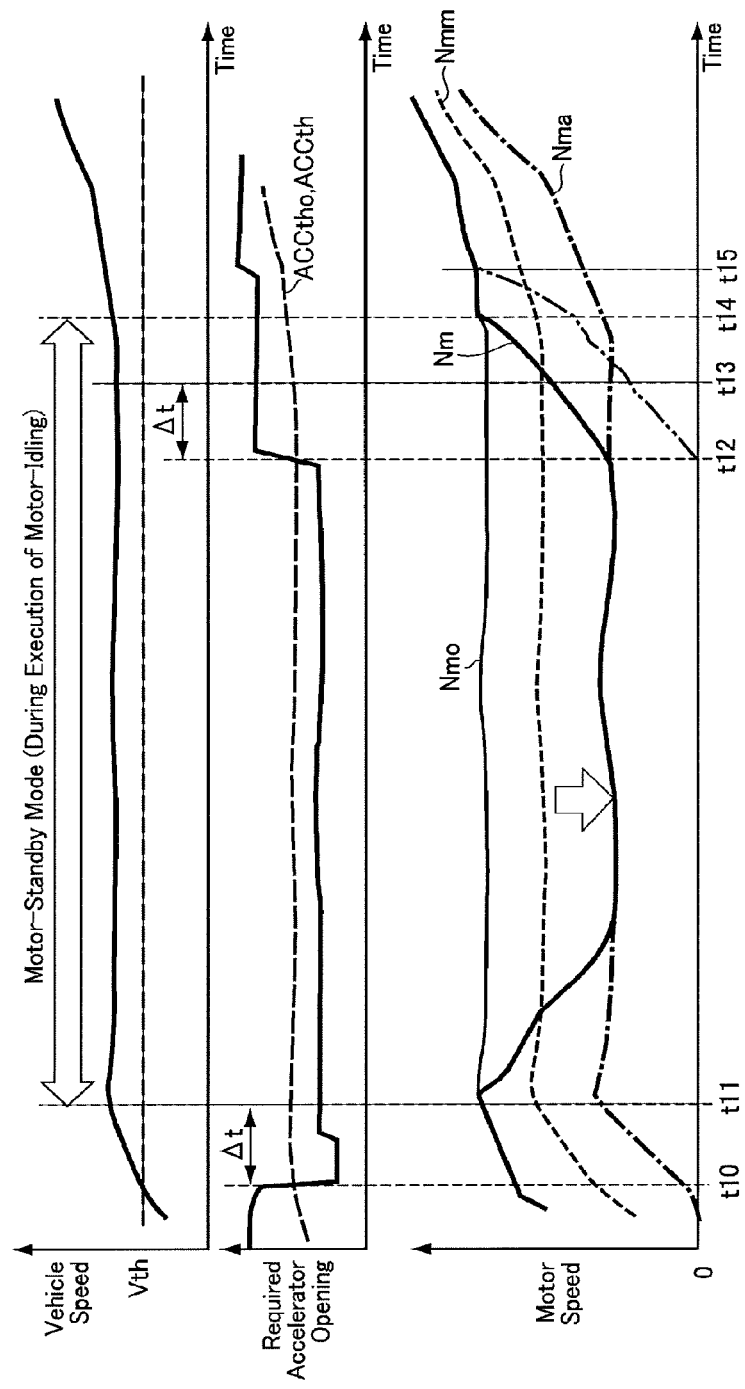
FIG. 7 is a time chart indicating a temporal change in a motor speed during execution of the motor-idling control in the autonomous mode.

Turning to FIG. 7, there is shown a temporal change in a speed of the second motor 13 during execution of the motor-idling control in the autonomous mode. In this case, the required opening degree of the accelerator is determined in line with the travel plan of the vehicle Ve prepared based on prospective data after Δt second from the present moment, and commencement and termination of the motor-idling control is determined based on the required opening degree of the accelerator. When the required opening degree of the accelerator is reduced to be smaller than the first threshold ACCtho at point t10, the motor-standby mode is commenced after Δt second from point t10, that is, at point t11. Specifically, the clutch 32 is released and the motor-idling control is executed. In this situation, the vehicle speed is higher than the threshold speed Vth, and hence the target speed Nm of the second motor 13 is set to the second standby speed Nma.

When the required opening degree of the accelerator is increased to be larger than the second threshold ACCth at point t12, the synchronization of the clutch 32 is executed to shift from the motor-standby mode to the motor-running mode. Specifically, the target speed Nm of the second motor 13 is altered from the second standby speed Nma to the speed Nmo of the second motor 13 in the motor-running mode thereby increasing the speed of the second motor 13 toward the speed Nmo. In this case, an actual opening degree of the accelerator starts increasing from point t13 that is Δt second from point t12. In this situation, however, the motor-standby mode is terminated in line with the travel plan and hence the synchronization of the clutch 32 is executed in advance to bring the clutch 32 into engagement. When the synchronization of the clutch 32 is completed at point t14, the motor-standby mode is terminated and the motor-running mode is commenced.

Thus, in the autonomous mode, the motor-idling control is executed at second standby speed Nma that is lower than the first standby speed Nmm selected in the manual mode. In the case of thus carrying out the motor-idling control in the autonomous mode, therefore, an electric power to operate the second motor 13 can be saved while reducing a power loss resulting from rotating the second motor 13 during execution of the motor-idling control. Consequently, energy efficiency of the vehicle Ve can be improved. In addition, the motor-idling control may be terminated based on the travel plan. For this reason, the above-explained synchronization of the speed of the second motor 13 and engagement of the clutch 32 can be executed based on the prospective data after Δt second to ensure acceleration response of the vehicle Ve even in the case of executing the motor-idling control.

In FIG. 7, the dashed-two dotted curve represents a temporal change in the speed of the second motor 13 according to a comparison example in which the motor-idling control is not executed. According to the comparison example, a period of time from point t12 to point t15 is required to complete the above-explained synchronization. By contrast, in the case of executing the motor-idling control, the above-explained synchronization is completed within a period from point t12 to point t14. Thus, acceleration response of the vehicle can be enhanced by executing the motor-idling control.

The vehicle control system according to the embodiment may also be applied to vehicles shown in FIGS. 8 to 13. In the following explanation, common reference numerals are allotted to the elements in common with those in the vehicle Ve shown in FIG. 2, and detailed explanation for the common elements will be omitted.

Figure 8:
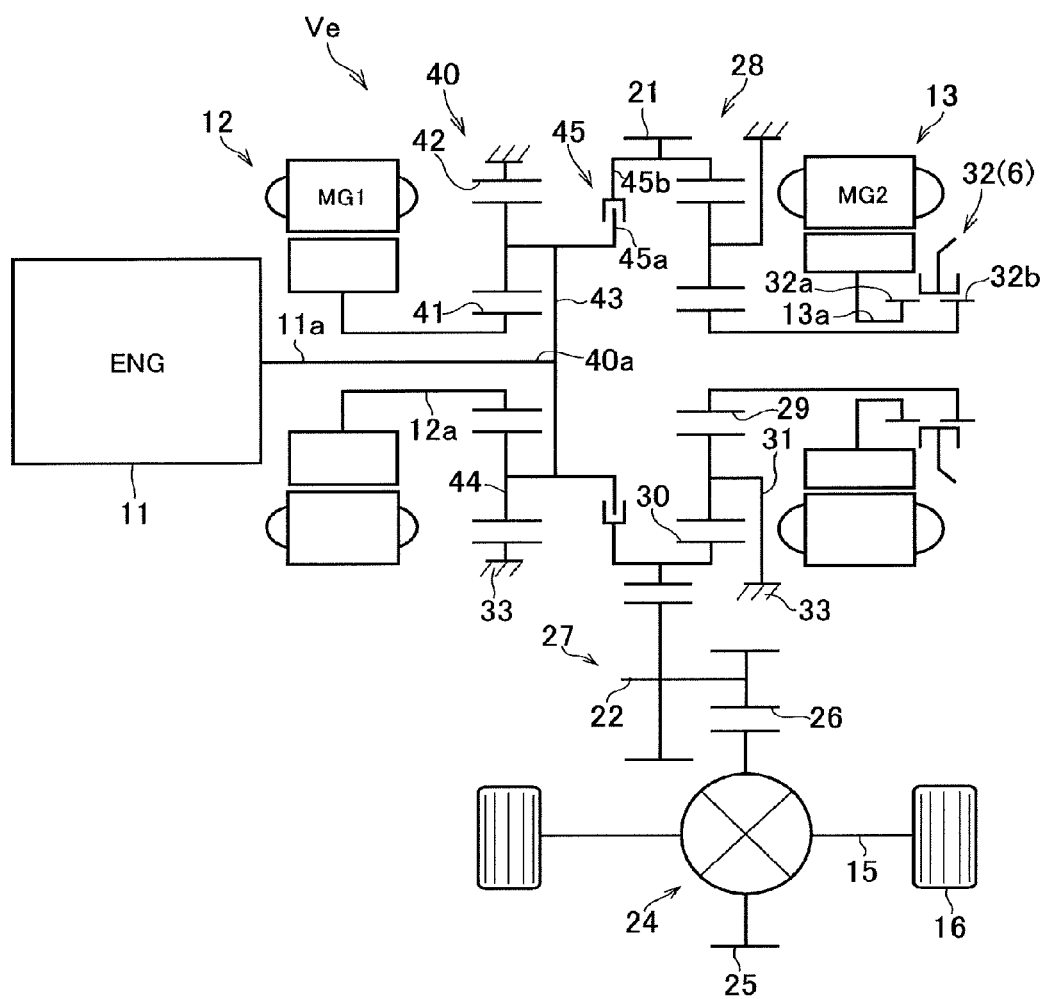
FIG. 8 is a schematic illustration showing a second example of the vehicle to which the vehicle control system according to the embodiment is applied.

Turning to FIG. 8, there is shown the second example of the vehicle Ve to which the control system according to the embodiment is applied. In the vehicle Ve shown in FIG. 8, the prime mover also includes the engine 11, the first motor 12 and the second motor 13, and the engine 11 is connected to the gear train 27 through a single-pinion planetary gear unit 40 disposed on the output shaft 11a of the engine 11.

In the planetary gear unit 40, a sun gear 41 is connected to the output shaft 12a of the first motor 12, and a ring gear 42 as an internal gear is arranged concentrically with the sun gear 41. Pinion gears 44 interposed between the sun gear 41 and the ring gear 42 while being meshed with those gears are supported by a carrier 43 in a rotatable and revolvable manner. The carrier 43 is connected to an input shaft 40a of the planetary gear unit 40 that is connected to the output shaft 11a of the engine 11 through a flywheel and a damper device (neither of which are shown).

The ring gear 42 of the planetary gear unit 40 is fixed to a stationary member 33 such as a casing in such a manner as not to be rotated. In the vehicle Ve shown in FIG. 8, therefore, an input speed to the planetary gear unit 40 from the output shaft 11a of the engine 11 is reduced when the output torque of the engine 11 is delivered to the first motor 12. That is, the planetary gear unit 40 serves as a speed reducing device that multiply the torque transmitted between the engine 11 and the first motor 12.

The carrier 43 of the planetary gear unit 40 is also connected to the drive gear 21 and the ring gear 30 of the speed reducing device 28 through a clutch 45 that selectively provides an engagement between a first rotary member 45a connected to the carrier 43 and a second rotary member 45b connected to the drive gear 21 and the ring gear 30.

The clutch 32 is also disposed between the second motor 13 and the sun gear 29 of the speed reducing device 28. In the vehicle Ve shown in FIG. 8, therefore, the motor-idling control may also be executed by manipulating the clutch 32.

Figure 9:
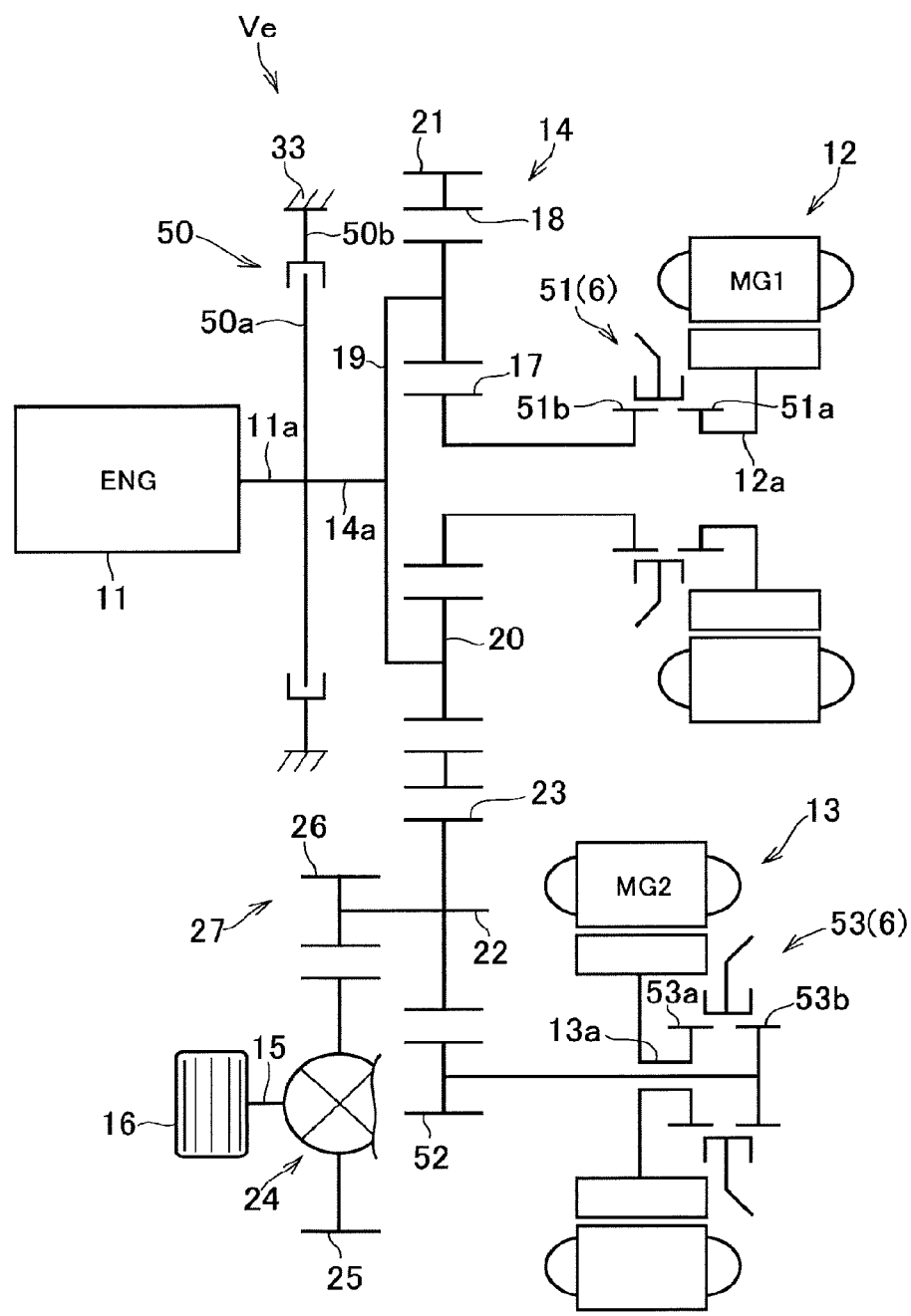
FIG. 9 is a schematic illustration showing a third example of the vehicle to which the vehicle control system according to the embodiment is applied.

Turning to FIG. 9, there is shown the third example of the vehicle Ve to which the control system according to the embodiment is applied. In the vehicle Ve shown in FIG. 9, the prime mover also includes the engine 11, the first motor 12 and the second motor 13, and the engine 11 and the first motor 12 are connected to the gear train 27 through the power distribution device 14. The second motor 13 is also connected to the gear train 27 through a clutch 53.

In the power distribution device 14, the sun gear 17 is connected to the output shaft 12a of the first motor 12, and the carrier 19 is connected to the input shaft 14a that is connected to the output shaft 11a of the engine 11. A brake 50 is disposed on the output shaft 11a of the engine 11 to selectively halt a rotation of the output shaft 11a, the input shaft 14a and the carrier 19. Specifically, the brake 50 is a clutch device adapted to selectively provide a connection between a rotary member 50a rotated together with the output shaft 11a connected to the input shaft 14a and a fixed member 50b fixed to the stationary member 33 such as a casing in such a manner as not to be rotated.

In the vehicle Ve shown in FIG. 9, a clutch 51 is disposed between the first motor 12 and the sun gear 17 of the power distribution device 14. The clutch 51 corresponds to the switching device 6 of the control system shown in FIG. 1, and is adapted to selectively provide a connection between a first rotary member 51a connected to the output shaft 12a of the first motor 12 and a second rotary member 51b connected to the sun gear 17. That is, in the third example shown in FIG. 9, the direct drive mode is achieved by connecting the first rotary member 51a to the second rotary member 51b by the clutch 51 so that the sun gear 17 and the output shaft 12a are rotated integrally. By contrast, the sun gear 17 and the output shaft 12a are allowed to rotate relatively at different speeds by disconnecting the first rotary member 51a from the second rotary member 51b by the clutch 51. That is, the differential drive mode is achieved.

In addition, in the vehicle Ve shown in FIG. 9, the clutch 53 is disposed between the second motor 13 and the drive gear 52 connected to the gear train 27. The clutch 53 also corresponds to the switching device 6 of the control system shown in FIG. 1. The drive gear 52 and the aforementioned drive gear 21 are meshed with the counter driven gear 23, and the clutch 53 is adapted to selectively provide a connection between a first rotary member 53a connected to the output shaft 13a of the second motor 13 and a second rotary member 53b connected to the drive gear 52. That is, in the third example shown in FIG. 9, the direct drive mode is also achieved by connecting the first rotary member 53a to the second rotary member 53b by the clutch 53 so that the drive gear 52 and the output shaft 13a are rotated integrally. By contrast, the drive gear 52 and the output shaft 13a are allowed to rotate relatively at different speeds by disconnecting the first rotary member 53a from the second rotary member 53b by the clutch 53. That is, the differential drive mode is also achieved.

According to the third example, the vehicle Ve shown in FIG. 9 is allowed to be powered by both of the first motor 12 and the second motor 13 while halting rotations of the output shaft 11a of the engine 11 and the carrier 19 of the power distribution device 14 by the brake 50. In the vehicle Ve shown in FIG. 9, when the driving mode is shifted from the motor-running mode in which the vehicle Ve is powered by both of the first motor 12 and the second motor 13 to the motor-standby mode, the motor to be brought into the standby mode is selected from the first motor 12 and the second motor 13 taking account of a torque distribution ratio between the first motor 12 and the second motor 13 and rotational conditions of those motors. For example, given that an output torque of the second motor 13 is larger than that of the first motor 12 and hence the acceleration response is expected to be enhanced effectively by bringing the second motor 13 into the standby mode, the motor-idling control of the second motor 13 is executed by manipulating the clutch 53. By contrast, that an output torque of the first motor 12 is larger than that of the second motor 13 and hence an electric consumption and a power loss to rotate the first motor 12 is expected to be reduced effectively by bringing the first motor 12 into the standby mode, the motor-idling control of the first motor 12 is executed by manipulating the clutch 51.

Figure 10:
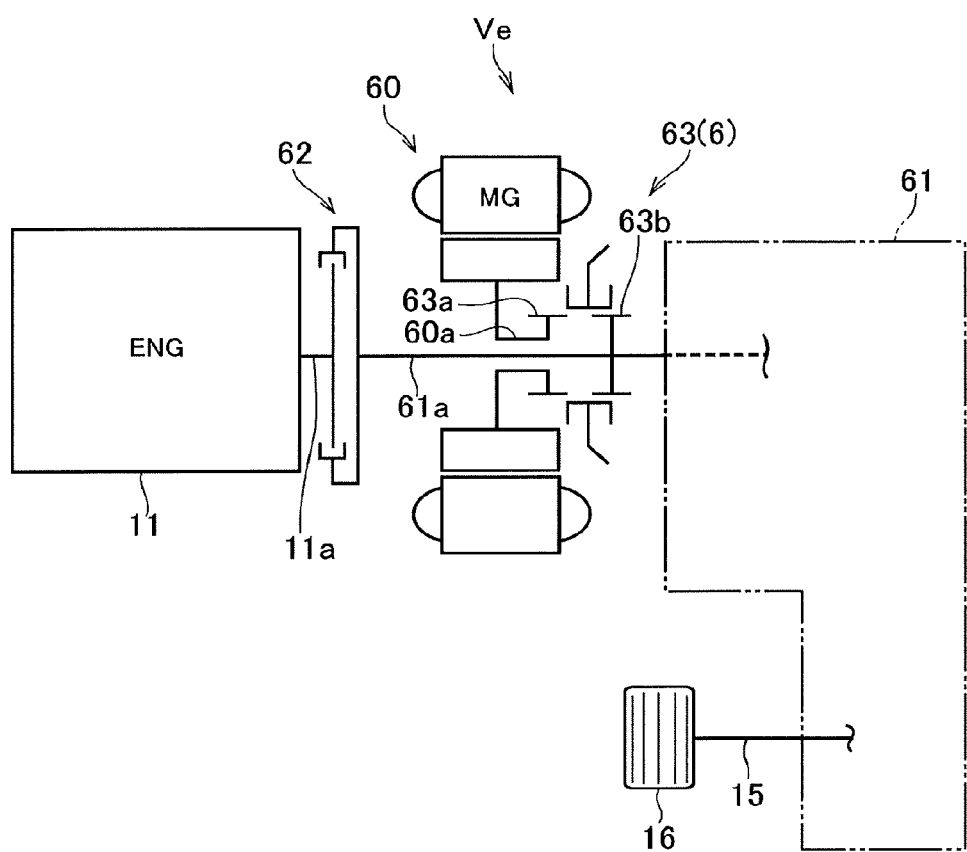
FIG. 10 is a schematic illustration showing a fourth example of the vehicle to which the vehicle control system according to the embodiment is applied.

Turning to FIG. 10, there is shown the fourth example of the vehicle Ve to which the control system according to the embodiment is applied. In the vehicle Ve shown in FIG. 10, the prime mover includes the engine 11 and a motor 60. In the vehicle Ve shown in FIG. 10, the engine 11 and the motor 60 are connected to the driveshaft 15 and the drive wheels 16 through a transmission 61 such as a conventional automatic geared transmission and a belt-driven continuously variable transmission. The output shaft 11a of the engine 11 is connected to an input shaft 61a of the transmission 61 through a starting clutch 62 or a torque converter (not shown). The motor 60 is also connected to the input shaft 61a through a clutch 63.

The clutch 63 corresponds to the switching device 6 of the control system shown in FIG. 1, and is disposed between the motor 60 and the transmission 61. The clutch 63 is adapted to selectively provide a connection between a first rotary member 63a connected to the output shaft 60a of the motor 60 and a second rotary member 63b connected to the input shaft 61a. That is, in the fourth example shown in FIG. 10, the direct drive mode is achieved by connecting the first rotary member 63a to the second rotary member 63b by the clutch 63 so that the transmission 61 and the output shaft 60a are rotated integrally. By contrast, the transmission 61 and the output shaft 60a are allowed to rotate relatively at different speeds by disconnecting the first rotary member 63a from the second rotary member 63b by the clutch 63. That is, the differential drive mode is achieved.

In the vehicle Ve shown in FIG. 10, accordingly, the above-explained motor-idling control can be executed by manipulating the clutch 63 disposed between the motor 60 and the input shaft 61a of the transmission 61.

Figure 11:
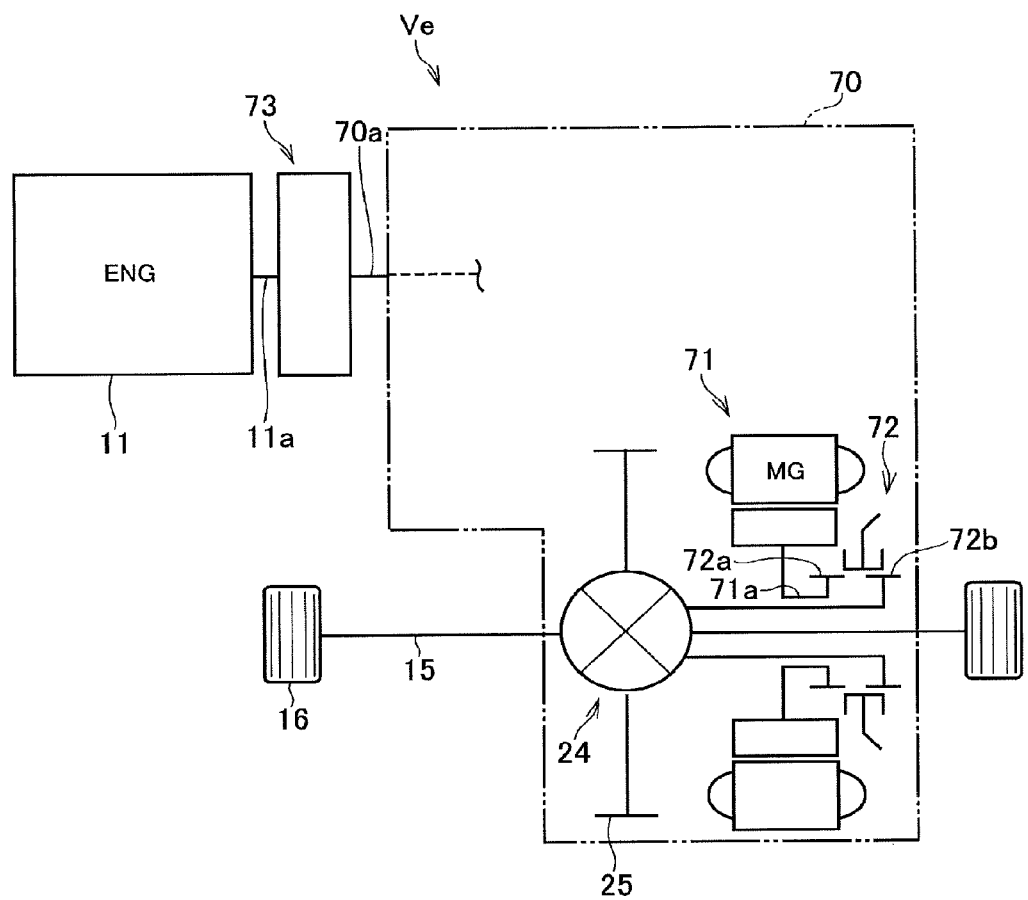
FIG. 11 is a schematic illustration showing a fifth example of the vehicle to which the vehicle control system according to the embodiment is applied.

Turning to FIG. 11, there is shown the fifth example of the vehicle Ve to which the control system according to the embodiment is applied. In the vehicle Ve shown in FIG. 11, the prime mover includes the engine 11 and a motor 71. In the vehicle Ve shown in FIG. 11, the engine 11 is connected to the driveshaft 15 and the drive wheels 16 through a transmission 70 such as a conventional automatic geared transmission and a belt-driven continuously variable transmission. The motor 71 is also connected to the driveshaft 15 and the drive wheels 16 through a clutch 72 and the differential gear unit 24. The output shaft 11a of the engine 11 is connected to an input shaft 70a of the transmission 70 through a starting clutch (not shown) or a torque converter 73.

The clutch 72 corresponds to the switching device 6 of the control system shown in FIG. 1, and is disposed between the motor 71 and the differential gear unit 24. The clutch 72 is adapted to selectively provide a connection between a first rotary member 72a connected to the output shaft 71a of the motor 71 and a second rotary member 72b connected to the ring gear 25 of the differential gear unit 24. That is, in the fifth example shown in FIG. 11, the direct drive mode is achieved by connecting the first rotary member 72a to the second rotary member 72b by the clutch 73 so that the ring gear 25 and the output shaft 71a are rotated integrally. By contrast, the ring gear 25 and the output shaft 71a are allowed to rotate relatively at different speeds by disconnecting the first rotary member 72a from the second rotary member 72b by the clutch 72. That is, the differential drive mode is achieved.

In the vehicle Ve shown in FIG. 11, accordingly, the motor-idling control can be executed by manipulating the clutch 72 disposed between the motor 71 and the differential gear unit 24.

Figure 12:
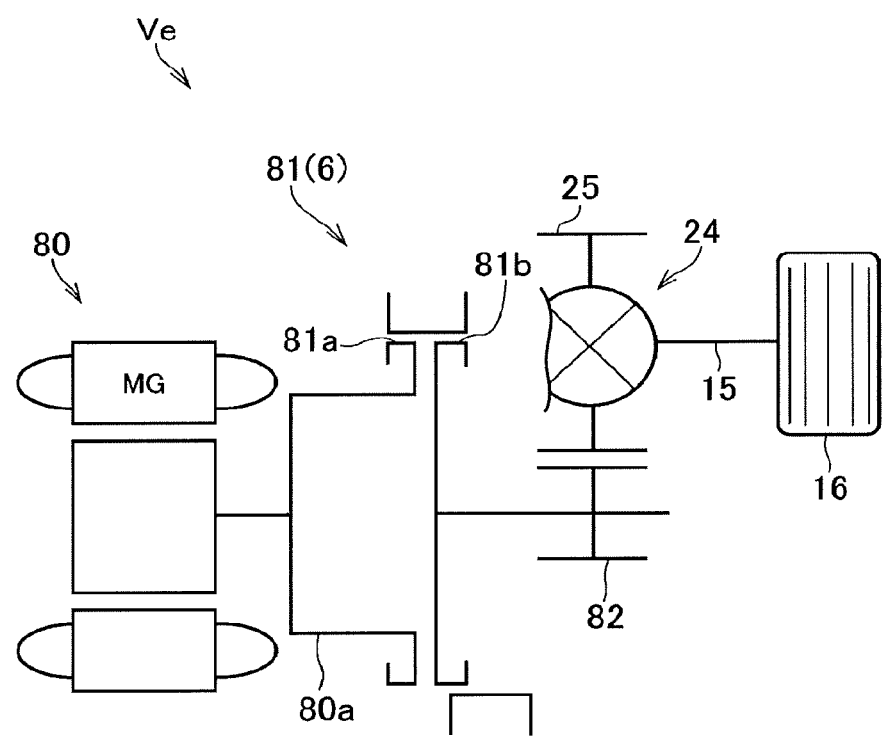
FIG. 12 is a schematic illustration showing a sixth example of the vehicle to which the vehicle control system according to the embodiment is applied.

Turning to FIG. 12, there is shown the sixth example of the vehicle Ve to which the control system according to the embodiment is applied. The vehicle Ve shown in FIG. 12 is an electric vehicle using a motor 80 as a prime mover, and the motor 80 is connected to the driveshaft 15 and the drive wheels 16 through a clutch 81 and the differential gear unit 24.

The clutch 81 also corresponds to the switching device 6 of the control system shown in FIG. 1, and is adapted to selectively provide a connection between a first rotary member 81a connected to an output shaft 80a of the motor 80 and a second rotary member 80b connected to a drive gear 82 meshed with the ring gear 25 of the differential gear unit 24. That is, in the sixth example shown in FIG. 12, the direct drive mode is achieved by connecting the first rotary member 81a to the second rotary member 81b by the clutch 81 so that the ring gear 25 and the output shaft 80a are rotated integrally. By contrast, the ring gear 25 and the output shaft 80a are allowed to rotate relatively at different speeds by disconnecting the first rotary member 81a from the second rotary member 81b by the clutch 81. That is, the differential drive mode is achieved.

In the vehicle Ve shown in FIG. 12, accordingly, the motor-idling control can be executed by manipulating the clutch 81 disposed between the motor 80 and the differential gear unit 24.

Figure 13:
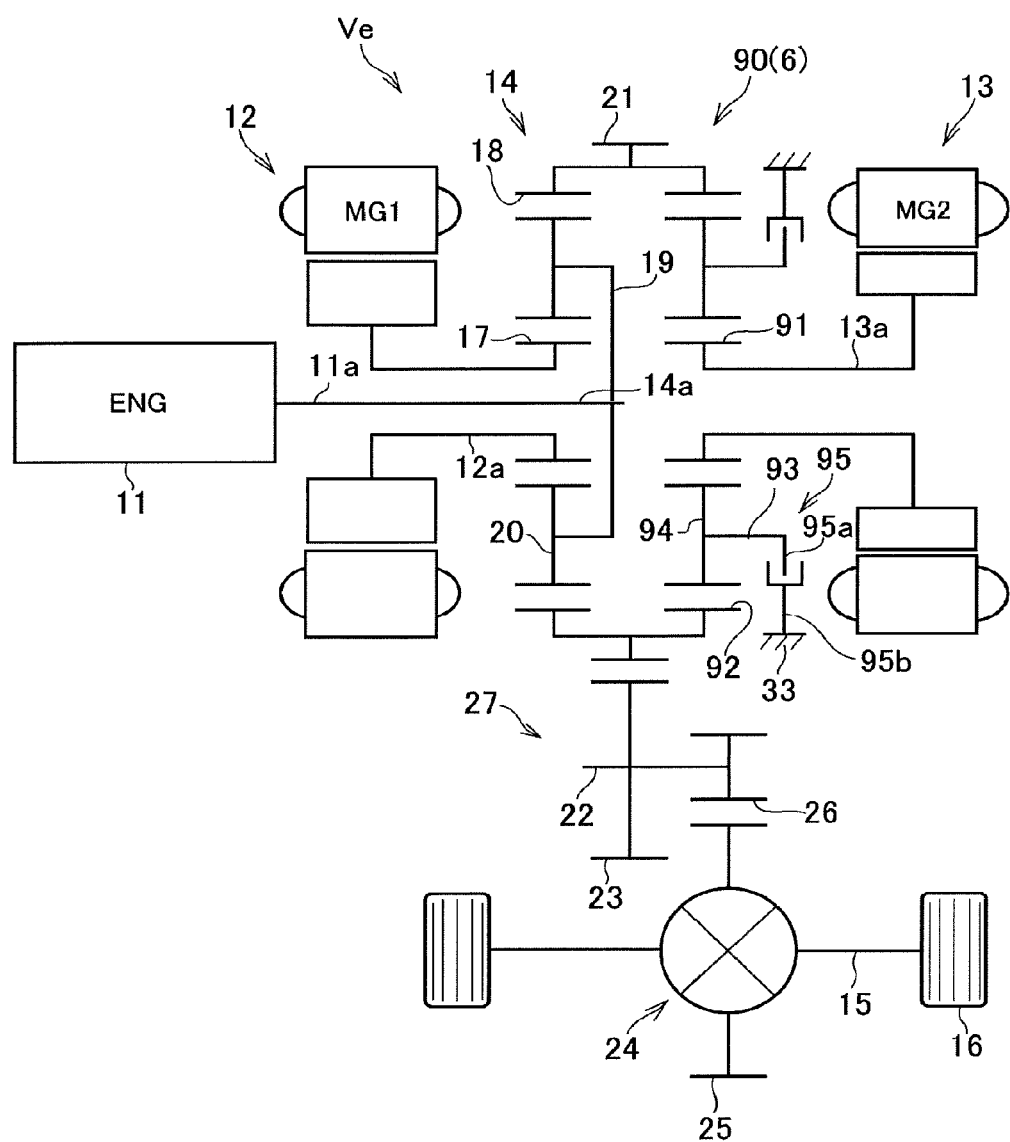
FIG. 13 is a schematic illustration showing a seventh example of the vehicle to which the vehicle control system according to the embodiment is applied.

Turning to FIG. 13, there is shown the seventh example of the vehicle Ve to which the control system according to the embodiment is applied. In the vehicle Ve shown in FIG. 13, the prime mover also includes the engine 11, the first motor 12 and the second motor 13, but the clutch device is not used as the switching device. In the vehicle Ve shown in FIG. 13, specifically, a planetary gear unit 90 is disposed between the second motor 13 and the gear train 27 instead of the clutch 32 of the first example shown in FIG. 2.

For example, a single-pinion planetary gear unit may be used as the planetary gear unit 90, and the planetary gear unit 90 is arranged coaxially with the output shaft 11a of the engine 11 and the output shaft 13a of the second motor 13.

In the planetary gear unit 90, a sun gear 91 is connected to the output shaft 13a of the second motor 13, and a ring gear 92 as an internal gear is arranged concentrically with the sun gear 91. Pinion gears 94 interposed between the sun gear 91 and the ring gear 92 while being meshed with those gears are supported by a carrier 93 in a rotatable and revolvable manner. The ring gear 92 is connected to the ring gear 18 of the power distribution device 14 in such a manner as to rotate integrally therewith, and the drive gear 21 is formed integrally around the ring gear 90.

The vehicle Ve shown in FIG. 13 is provided with a brake 95 to selectively halt a rotation of the carrier 93 of the planetary gear unit 90. Specifically, the brake 95 is a clutch device adapted to selectively provide a connection between a rotary member 95a rotated together with the carrier 93 and a fixed member 95b fixed to the stationary member 33 such as a casing in such a manner as not to be rotated.

In the seventh example shown in FIG. 13, accordingly, the direct drive mode is achieved by engaging the rotary member 95a to the fixed member 95b by manipulating the brake 95 at so that the output shaft 31a and the drive gear 21 are allowed to rotate cooperatively at a predetermined speed ratio. By contrast, the output shaft 13a and the drive gear 25 are allowed to rotate relatively at different speeds by disconnecting the rotary member 95a from the fixed member 95b by the clutch 81. That is, the differential drive mode is achieved.

Figure 14:
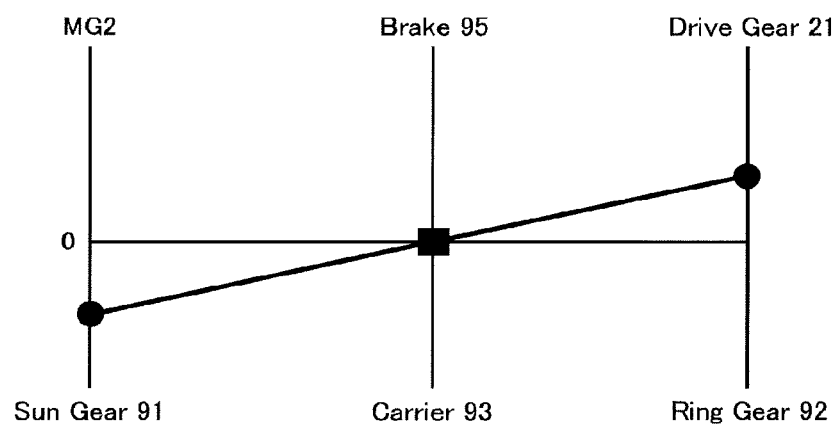
FIG. 14 is a nomographic diagram indicating rotational speeds of the rotary elements of the vehicle shown in FIG. 13 in the direct drive mode.

FIG. 14 is a nomographic diagram indicating rotational speeds of the output shaft 13a and the drive gear 21 in the vehicle shown in FIG. 13. In the situation shown in FIG. 14, the brake 95 is in engagement to achieve the direct drive mode. In the planetary gear unit 90, the sun gear 91 and the ring gear 92 are rotated in opposite directions by halting a rotation of the carrier 93 by the brake 95. In this situation, although the sun gear 91 and the ring gear 92 are rotated in opposite directions, the sun gear 91 and the ring gear 92 are rotated at substantially same speeds in opposite directions. That is, the direct drive mode is achieved by bringing the brake 95 into engagement.

Figure 15:
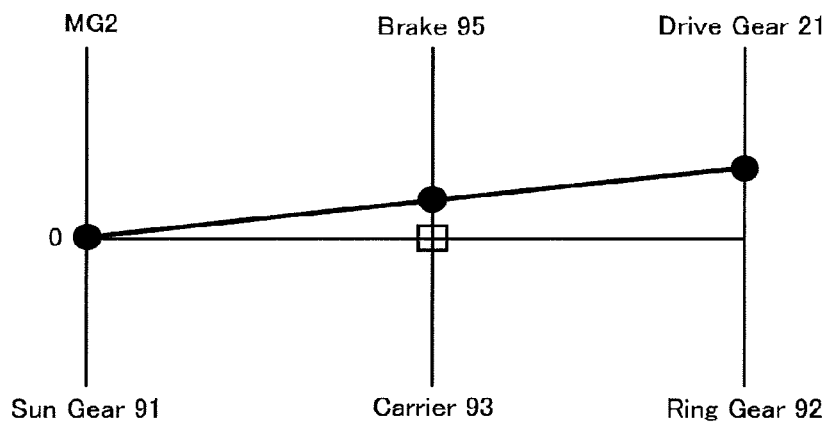
FIG. 15 is s a nomographic diagram indicating rotational speeds of the rotary elements of the vehicle shown in FIG. 13 in the differential drive mode.

Whereas, FIG. 15 shows rotational speeds of the output shaft 13a and the drive gear 21 of a case in which the brake 95 is in disengagement to achieve the differential drive mode. In the planetary gear unit 90, the sun gear 91 and the ring gear 92 are rotated in the same direction at different speeds by releasing the brake 95 to allow the carrier 93 to rotate freely. In this situation, a rotational speed of the sun gear 91 connected to the output shaft 13a of the second motor 13 can be altered arbitrarily with respect to that of the ring gear 92 connected to the drive gear 21. In FIG. 15, although the rotational speed of the second motor 13 is fixed to zero, the sun gear 92 may also be rotated freely without controlling the rotational speed of the second motor 13. Instead, the rotational speed of the second motor 13 may also be controlled in such a manner that the sun gear 91 is rotated at the standby speed for the motor-idling control. In addition, given that a friction clutch that is allowed to be engaged partially is used as the brake 95, the rotational speed of the sun gear 91 may be controlled arbitrarily by controlling an engagement status of the brake 95. That is, the differential drive mode can be achieved in this case by releasing or partially engaging the brake 95.

Thus, in the vehicle Ve shown in FIG. 13, the driving mode can be switched between the direct drive mode and the differential drive mode by manipulating the brake 95 of the planetary gear unit 90. In the differential drive mode, the rotational speed of the second motor can be fixed to the standby speed of the motor-idling control. That is, the motor-idling control may also be executed in the vehicle Ve shown in FIG. 13.

Although the above exemplary embodiments of the present application have been described, it will be understood by those skilled in the art that the present application should not be limited to the described exemplary embodiments, and various changes and modifications can be made within the spirit and scope of the present application.

What is claimed is:
1. A vehicle control system that is applied to a vehicle comprising:
   a controller that controls the vehicle;
   a motor having an output shaft that serves as a prime mover;
   a drive wheel rotated at least by the motor;
   a power transmission route between the motor and the drive wheel;
   a rotary shaft that is disposed on the power transmission route in the drive wheel side; and a switching device that switches a driving mode of the vehicle between a direct drive mode in which the output shaft and the rotary shaft are rotated integrally or cooperatively at a predetermined speed ratio, and a differential drive mode in which the output shaft and the rotary shaft are rotated relatively or at different speeds;

wherein the driving mode of the vehicle is further selected from a motor-running mode in which the vehicle is powered by the motor in the direct drive mode, and a motor-standby mode in which the vehicle is powered by a power other than an output power of the motor in the differential drive mode, and wherein an operating mode of the vehicle is selected from a manual mode in which the vehicle is operated by a manual operation executed by a driver, and an autonomous mode in which the vehicle is operated autonomously in line with a travel plan determining a prospective required driving force, wherein the controller is configured to:

execute a motor-idling control to keep a speed of the motor to a standby speed that is lower than a speed of the rotary shaft during propulsion of the vehicle in the motor-standby mode;

select a first standby speed in a case that the vehicle is propelled in the motor-standby mode and that the manual mode is selected; and select a second standby speed that is lower than the first standby speed in a case that the vehicle is propelled in the motor-standby mode and that the autonomous mode is selected.

2. The vehicle control system as claimed in claim 1, wherein the controller is further configured to increase the first standby speed and the second standby speed with an increase in a vehicle speed.

3. The vehicle control system as claimed in claim 1, wherein the controller is further configured to determine a termination of the motor-standby mode based on the travel plan during execution of the motor-idling control in the motor-standby mode in a case that the vehicle is operated autonomously.

4. The vehicle control system as claimed in claim 1, wherein the switching device includes a clutch device having a first rotary member connected to the output shaft and a second rotary member connected to the rotary shaft, and wherein the clutch device is adapted to selectively provide a connection between the first rotary member and the second rotary member.

5. The vehicle control system as claimed in claim 1, wherein the switching device includes a planetary gear unit having a first rotary element connected to the output shaft, a second rotary element connected to the rotary shaft, and a third rotary element, and wherein the planetary gear unit is adapted to allow a differential rotation between the first rotary element and the second rotary element.

* * * * *